(12) United States Patent
Nowastowski-Stock et al.

(10) Patent No.: US 11,901,719 B2
(45) Date of Patent: Feb. 13, 2024

(54) CABLE FEEDTHROUGH FOR FEEDING A CABLE THROUGH A SEPARATING ELEMENT AND ASSEMBLY

(71) Applicant: CONTA-CLIP VERBINDUNGSTECHNIK GMBH, Hövelhof (DE)

(72) Inventors: Jörg Nowastowski-Stock, Detmold (DE); Frank Ludolph, Geseke (DE)

(73) Assignee: CONTA-CLIP VERBINDUNGSTECHNIK GMBH, Hövelhof (DE)

( * ) Notice: Subject to any disclaimer, the term of this patent is extended or adjusted under 35 U.S.C. 154(b) by 231 days.

(21) Appl. No.: 17/423,721

(22) PCT Filed: Jan. 22, 2020

(86) PCT No.: PCT/DE2020/100038
§ 371 (c)(1),
(2) Date: Jul. 16, 2021

(87) PCT Pub. No.: WO2020/151785
PCT Pub. Date: Jul. 30, 2020

(65) Prior Publication Data
US 2022/0085588 A1    Mar. 17, 2022

(30) Foreign Application Priority Data
Jan. 23, 2019  (DE) ................. 20 2019 100 362.6

(51) Int. Cl.
*H02G 3/22*  (2006.01)
*H01B 17/30*  (2006.01)
(52) U.S. Cl.
CPC ............ *H02G 3/22* (2013.01); *H01B 17/30* (2013.01)

(58) Field of Classification Search
CPC ........ H02G 3/22; H02G 15/013; H02G 3/088; H02G 3/083; H02G 3/185; H02G 3/0675;
(Continued)

(56) References Cited

U.S. PATENT DOCUMENTS

| 6,521,840 B1 | 2/2003 | Kreutz |
| 2013/0206472 A1* | 8/2013 | Stevenson ............ A61N 1/3754 174/659 |

(Continued)

FOREIGN PATENT DOCUMENTS

| CN | 1378715 A | 11/2002 |
| CN | 107592951 A | 1/2018 |

(Continued)

OTHER PUBLICATIONS

International Search Report and Written Opinion of the International Searching Authority, issued in PCT/DE2020/100038, dated Apr. 24, 2020; ISA/EP.

*Primary Examiner* — Krystal Robinson
(74) *Attorney, Agent, or Firm* — Harness, Dickey & Pierce, P.L.C.

(57) ABSTRACT

The invention relates to a cable feedthrough for feeding cables through a separating element, comprising: a feedthrough housing (2), which has a housing interior (7), which is delimited by a lateral housing wall (8) and a housing bottom (9) having a bottom opening (10) for feeding a plurality of cables through; a dividing component (3), which is arranged in the housing interior (7) opposite the housing bottom (9) and provides receptacles (15); and sealing elements (4), which are each arranged in one of the receptacles (15) and which each have a cable passage (19), which is designed to sealingly receive a cable. In one embodiment, a screw-in and locking component (5) is provided, which has a proximal screw-thread portion (22) and a distal screw-thread portion (23) with respect to the feedthrough housing (Continued)

Figure 1:
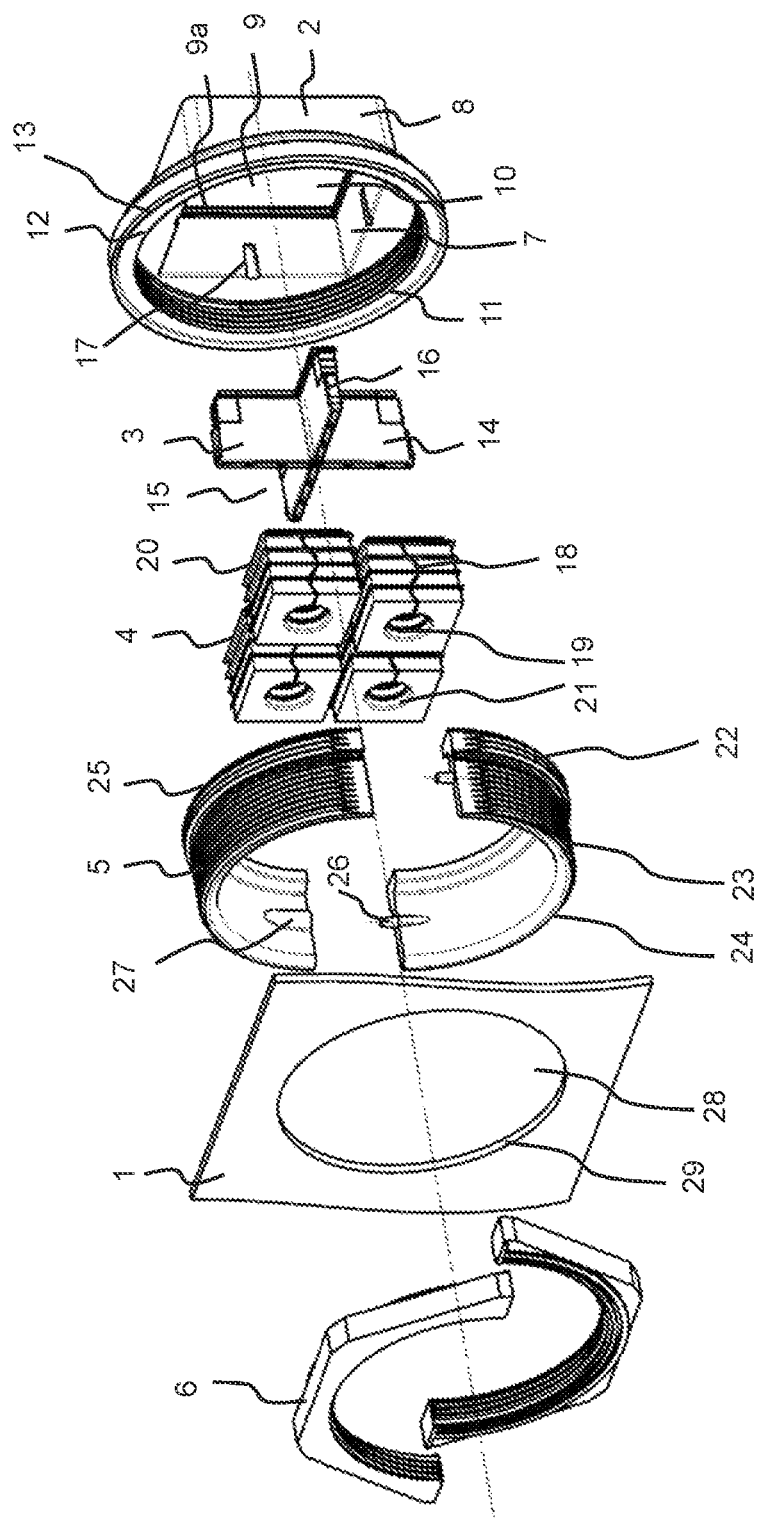

(2), the proximal screw-thread portion (22) being screwed into an internal screw-thread portion (11) of the feedthrough housing (2) in such a way that the dividing component (3) and the sealing elements (4) are thus secured in the housing interior (7) by means of the screw-in and locking component (5), and the distal screw-thread portion (23) being designed to form, with a threaded connection partner, a screw connection for mounting the feedthrough housing (2) in the region of an opening (28) in a separating element (1). The invention further relates to an assembly.

13 Claims, 6 Drawing Sheets

(58) Field of Classification Search
CPC .... H02G 3/0616; H02G 15/007; H02G 15/04; H02G 15/113; H02G 3/06; H02G 3/0691; H02G 15/22; H02G 3/0412; H02G 15/046; H02G 15/06; H02G 15/068; H02G 15/072; H02G 15/10; H02G 15/105; H02G 15/117; H02G 3/0468; H02G 3/0481; H02G 3/0625; H02G 3/0641; H02G 3/0666; H02G 3/0683; H02G 3/085; H02G 3/16; H02G 3/18; H02G 3/26; H02G 1/06; H02G 15/076; H02G 15/107; H02G 15/12; H02G 15/18; H02G 15/1806; H02G 15/192; H02G 15/23; H02G 15/26; H02G 15/32; H02G 15/34; H02G 3/04; H02G 3/0406; H02G 3/0418; H02G 3/0633; H02G 3/065; H02G 3/0658; H02G 3/08; H02G 3/125; H02G 3/32; H02G 9/06; H02G 9/12
See application file for complete search history.

(56) References Cited

U.S. PATENT DOCUMENTS

| | | |
|---|---|---|
| 2018/0151275 A1* | 5/2018 | Coyle .................. H02G 3/22 |
| 2018/0301883 A1 | 10/2018 | Nowastowski-Stock |
| 2019/0326739 A1 | 10/2019 | Nowastowski-Stock |

FOREIGN PATENT DOCUMENTS

| | | |
|---|---|---|
| DE | 102013110545 A1 | 3/2015 |
| DE | 2020015102280 A1 | 5/2016 |
| DE | 202016103494 U1 | 7/2017 |
| EP | 2096346 A2 | 9/2009 |
| EP | 2852015 A1 | 3/2015 |
| JP | 2018516062 A | 6/2018 |

* cited by examiner

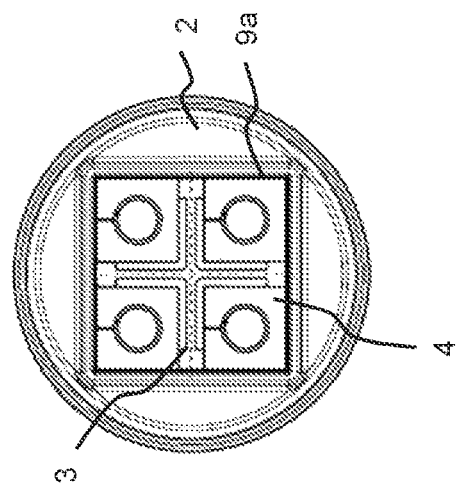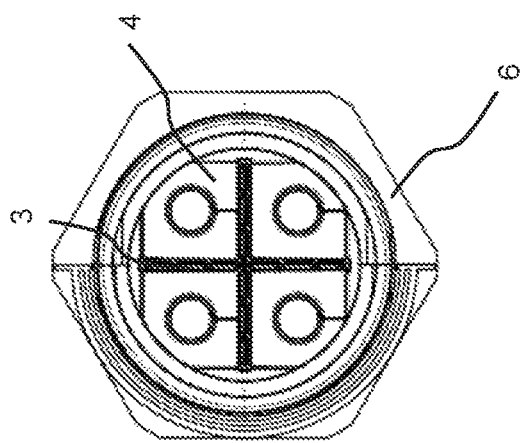
Fig. 4

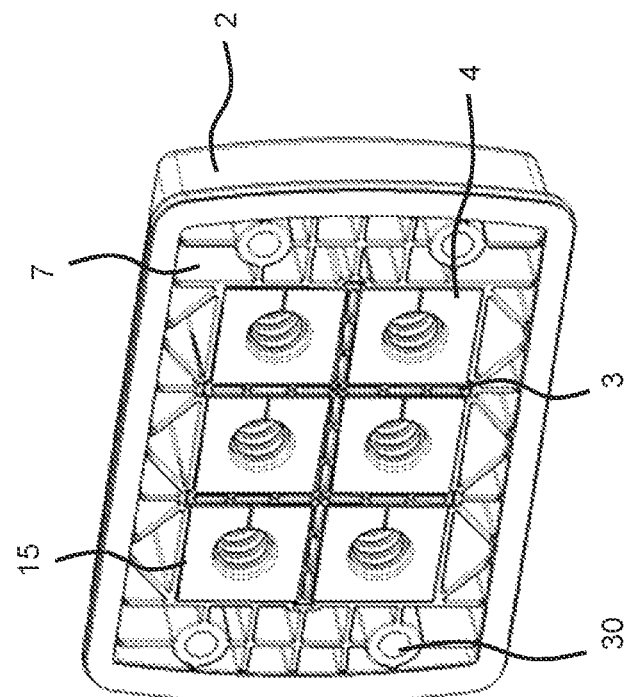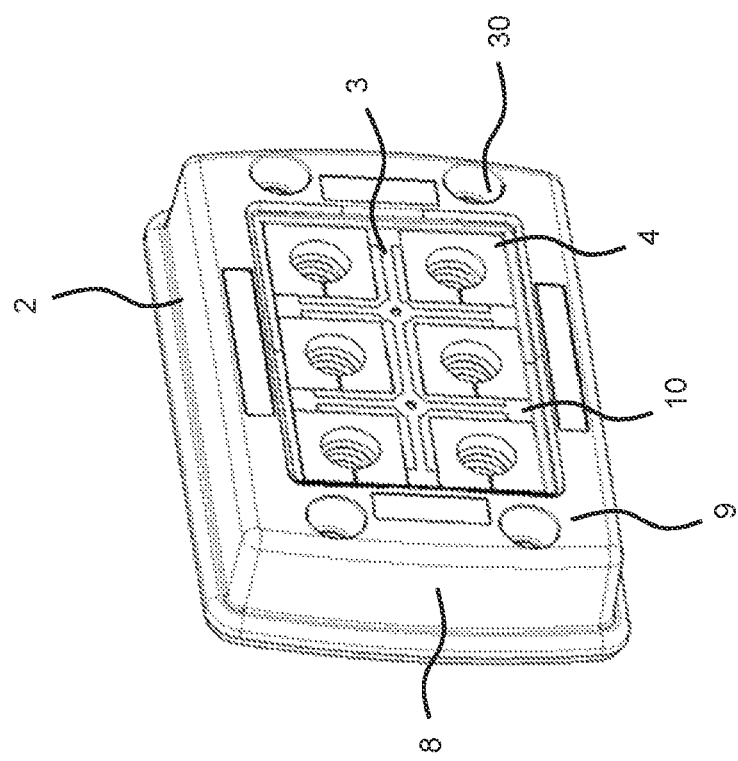
Fig. 5

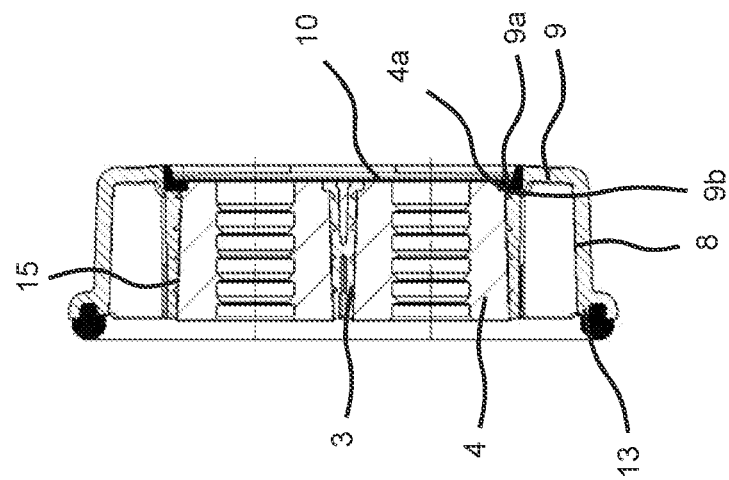
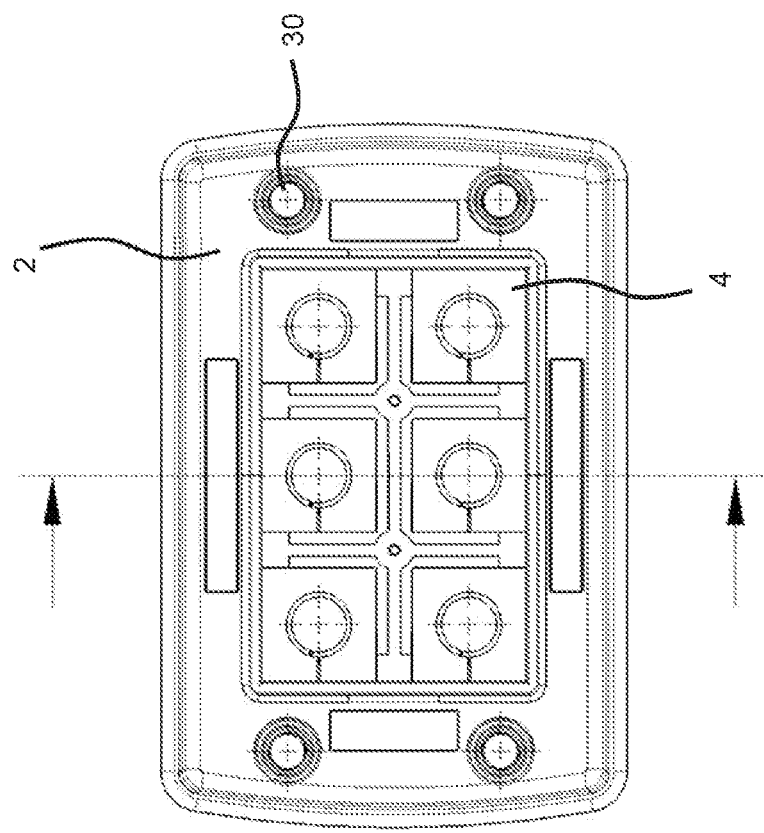

CABLE FEEDTHROUGH FOR FEEDING A CABLE THROUGH A SEPARATING ELEMENT AND ASSEMBLY

CROSS-REFERENCE TO RELATED APPLICATIONS

This application is a 371 U.S. National Stage of International Application No. PCT/DE2020/100038, filed on Jan. 22, 2020, which claims priority to German Application No. 20 2019 100 362.6, filed on Jan. 23, 2019. The entire disclosures of the above applications are incorporated herein by reference.

The invention relates to a cable feedthrough for feeding cables through a separating element, for example, a separating or housing wall, and an assembly.

BACKGROUND

Such cable feedthroughs are used in various applications to feed one or more cables through a separating element, particularly a separating wall. It is often necessary here for the cables to be fed through an opening in the separating element in a sealed manner, particularly in order to be sealed against the ingress of moisture or dirt. The cables are arranged in a passage of an associated sealing element for the sealing feedthrough.

A cable feedthrough for feeding cables through a separating element is known from the document DE 10 2013 110 545 A1. The cable feedthrough has a holding part which provides a feedthrough housing. The feedthrough housing has a bottom and a laterally circumferential housing wall. The bottom is formed in one piece with the lateral housing wall. Receptacles are provided in the bottom, into which receptacles sealing elements are inserted, which provide a respective passage for receiving a cable. A guide part is locked in the holding part and is secured to the holding part with the aid of a positive-locking connection. When mounting the cable feedthrough in the region of an opening of a separating element, a grommet made of an elastic material is arranged in the opening, which has a passage for receiving a portion of the guide part of the cable feedthrough, into which the guide part of the cable feedthrough is then inserted. An end face of the holding part facing the separating element forms a stop which is brought to a stop against an end face of the grommet when the cable feedthrough is mounted. The guide part of the cable feedthrough is sealingly arranged in the opening of the separating element and is held there by means of the grommet.

SUMMARY

The object of the invention is to provide a cable feedthrough for feeding cables through a separating element and an assembly comprising a cable feedthrough that ensures flexible adaptation of the cable feedthrough to different application situations and secure mounting of the cable feedthrough on a separating element.

A cable feedthrough for feeding cables through a separating element according to independent claim 1 and independent claim 12 is created to achieve this. Furthermore, an assembly according to claim 10 is provided. Embodiments are the subject of dependent subclaims.

According to one aspect, a cable feedthrough for feeding cables through a separating element is created, which is formed with a feedthrough housing, which has a housing interior that is delimited by a lateral housing wall and a housing bottom having a bottom opening for feeding a plurality of cables through. Furthermore, a dividing component, which is arranged in the housing interior opposite the housing bottom and provides receptacles, and sealing elements are provided, which are each arranged in one of the receptacles and which each have a cable passage which is designed to sealingly receive a cable. The cable feedthrough further has a screw-in and locking component, which has a proximal screw-thread portion and a distal screw-thread portion with respect to the feedthrough housing. The proximal screw-thread portion is screwed into an internal screw-thread portion of the feedthrough housing in such a way that the dividing component and the sealing elements are thus secured in the housing interior by means of the screw-in and locking component. The distal screw-thread portion is designed to form, with a threaded connection partner, a screw connection for mounting the feedthrough housing in the region of an opening in a separating element.

According to one aspect, a cable feedthrough for feeding cables through a separating element is created, which is formed with a feedthrough housing, which has a housing interior that is delimited by a lateral housing wall and a housing bottom having a bottom opening for feeding a plurality of cables through. Furthermore, a dividing component, which is arranged in the housing interior opposite the housing bottom and provides receptacles, and sealing elements are provided, which are each arranged in one of the receptacles and which each have a cable passage which is designed to sealingly receive a cable. The bottom opening in the region of the housing bottom is surrounded at least in portions by a seal arranged on the feedthrough housing, on which seal the sealing elements, when arranged in the receptacle, sealingly come to rest against.

The arrangement of the dividing component and the sealing elements in the receptacles of the dividing component enables the cable feedthrough to be individually adapted to different application situations. The sealing elements can be individually adapted to different tasks in order to then arrange said sealing elements in the receptacles for forming the cable feedthrough. The sealing elements can have a separating cut in the longitudinal direction, which makes it possible to open the sealing element in the region of the separating cut in order to arrange a cable in the passage provided in the sealing element.

With the aid of the screw connection to be formed using the distal screw-thread portion, the cable feedthrough can be securely mounted on the separating element, particularly also in applications in which the cable feedthrough is exposed to vibrations or impacts during operation. For such applications, the cable feedthrough is further optimized in that the dividing component and the sealing elements are fixed and secured by means of the screw-in and locking component after the screw-in and locking component has been screwed into the feedthrough housing, wherein it can be provided that the sealing elements are clamped on the end-face side.

The housing interior can have a polygonal cross-section, for example, a square cross-section, transversely to the longitudinal direction of the cables to be fed through. Similarly, the receptacles that are provided by means of the dividing component can have an angular cross-section into which the sealing elements fit in a positive-locking manner.

The screw-in and locking component can be formed with a single breakthrough or passage through which the plurality of cables extend. Alternatively, a plurality of passages can be provided in the screw-in and locking component, each of which is used to receive one or more cables.

The housing bottom can be formed with a circumferential edge which surrounds the opening for the cables. The dividing component can come to rest against this.

The cable feedthrough can particularly be mounted on a separating element designed as a separating or housing wall.

The sealing elements can be made of an elastic material, and the screw-in and locking component can press against the sealing elements in the screwed-in position so that said sealing elements sealingly receive a respective cable. It can be provided that the screw-in and locking component, in the screwed-in position, presses exclusively or additionally against an end face facing the opening of the separating element (surface of the sealing element which surrounds an exit of the cable passage). A seal is formed around the cable received in the sealing element by means of pressing the sealing element made of elastic material. At the same time, the sealing element is pressed against the wall portions surrounding the receptacle of the sealing element, so that a sealing effect is also formed in these regions. As an alternative or in addition to pressing against the end face of the sealing element, it can be provided that pressure elements are formed on the screw-in and locking component, which pressure elements, when screwing in, press obliquely against surface portions of the sealing element, for example, obliquely against a front edge.

The dividing component can be arranged in the housing interior in a self-retaining manner. The dividing component is detachably received in the housing interior in these or other embodiments. A self-retaining mounting can be achieved, for example, by means of clamping or clipping in the dividing component in the housing interior. In the screwed-in state, the screw-in and locking component then additionally secures the dividing component in the housing interior, so that, for example, protection against loosening due to oscillations or vibrations of the cable feedthrough during operation is formed.

The dividing component can be arranged in associated guides on an interior side of the feedthrough housing. The guides can be formed with channels, grooves or depressions, be it in the region of the lateral housing wall and/or the housing bottom. If the associated guides are (also) formed in the region of the lateral housing wall, said guides can be used to guide the dividing component when it is inserted from the end-face opening of the feedthrough housing opposite the bottom, for example, to support the simplest possible arrangement of the dividing component in the correct mounting position.

The proximal and distal screw-thread portion can be formed on component portions of the screw-in and locking component, which have different outer diameters. For example, the component portion with the proximal screw-thread portion can have a smaller diameter than the component portion with the distal screw-thread portion. Alternatively, the distal and the proximal screw-thread portion can have the same outer diameter. A thread-free portion for separating the distal and the proximal screw-thread portion can be provided between the two screw-thread portions.

The screw-in and locking component can be constructed in several parts. Component pieces that are detachably connected to one another can be provided for the screw-in and locking component, for example, two component halves, for example, in the form of half-tube portions. The component pieces can, for example, be joined together for mounting, for example, by virtue of the fact that projections formed on the component pieces engage in associated receptacles. It can be provided that the component pieces are connected by means of clamps or clips. The screw-in and locking component can be divided in the longitudinal direction, which makes it possible to arrange the cables to be fed through in between before the component pieces are brought together. Alternatively, the screw-in and locking component can be made in one piece. Alternatively, the screw-in and locking component can be made in one piece or in one part.

A stop for inserting the screw-in and locking component can be formed in the opening of the separating element on the component portion of the screw-in and locking component on which the proximal screw-thread portion is arranged. When mounting the cable feedthrough, the stop can come to a stop on a surface of the separating element, for example, on an outer surface of a separating wall.

The feedthrough housing can have a circumferential seal on an end face which comes to rest against the separating element during mounting. The seal can be made of an elastic material. It can be provided that the seal is formed in one piece on the feedthrough housing, for example, by means of 2C injection molding. Alternatively, it can be provided that the seal is detachably arranged on the feedthrough housing, for example, as a removable sealing ring.

In one embodiment of the cable feedthrough with the screw-in and locking component, it can be provided that the bottom opening in the region of the housing bottom is surrounded by a seal at least in portions. The seal can be provided as an alternative or in addition to the seal on the end face, be it continuous or interrupted around the bottom opening.

In the various configurations, the seal in the region of the housing bottom can be formed with a web or a projection (sealing web or sealing projection). The seal can be integrally formed on the feedthrough housing, for example, by means of 2C injection molding, for example, as a plastic soft component, while the feedthrough housing is made of a plastic hard component. In this way, the seal can be arranged or molded onto the feedthrough housing in a positive-locking and captive manner. Here, the seal is in sealing contact with a rear and/or a lateral surface of the sealing elements when said sealing elements are inserted or pushed into an associated receptacle. It can be provided that the seal, which is formed completely or partially encompassing the housing bottom, encompasses an edge region of the sealing element. Alternatively or in addition, it can be provided that the seal, for example, a sealing web, lies in a groove on the sealing element introduced into the receptacle. The seal can have an L-shape in cross-section.

In one example, the seal can protrude from an inner wall that runs in the cable feedthrough direction and thus form a stop for the sealing element to be inserted into the associated receptacle.

The receptacles provided in the housing interior by means of the dividing component can be conical in form. The receptacles can taper or decrease in size in the direction of the bottom of the feedthrough housing. The sealing elements can have a conical outer shape for the positive-locking fitting thereof.

The configurations described above in connection with the cable feedthrough can be provided accordingly in connection with the assembly. In the assembly comprising separating element and cable feedthrough, it can be provided that the distal screw-thread portion of the screw-in and locking component of the cable feedthrough is screwed to an internal screw-thread in the region of the opening of the separating element and/or a fastening component in order to form the screw connection. If the opening of the separating element through which the cables are to be fed through has an internal screw-thread, the distal screw-thread portion of the screw-in and locking component can be screwed in for mounting. Additionally or alternatively, it can be provided that a fastening component is screwed onto the distal screw-thread portion to fasten the cable feedthrough in the region of the opening of the separating element, for example, a separating wall, after the distal screw-thread portion has been pushed through the opening of the separating element. The feedthrough housing is then screwed tightly to the separating element with the aid of the fastening component, wherein a wall of the separating element is clamped between the fastening component and the feedthrough housing by means of screwing. The fastening component can be, for example, a lock nut or union nut.

DESCRIPTION OF EMBODIMENTS

Figure 2:
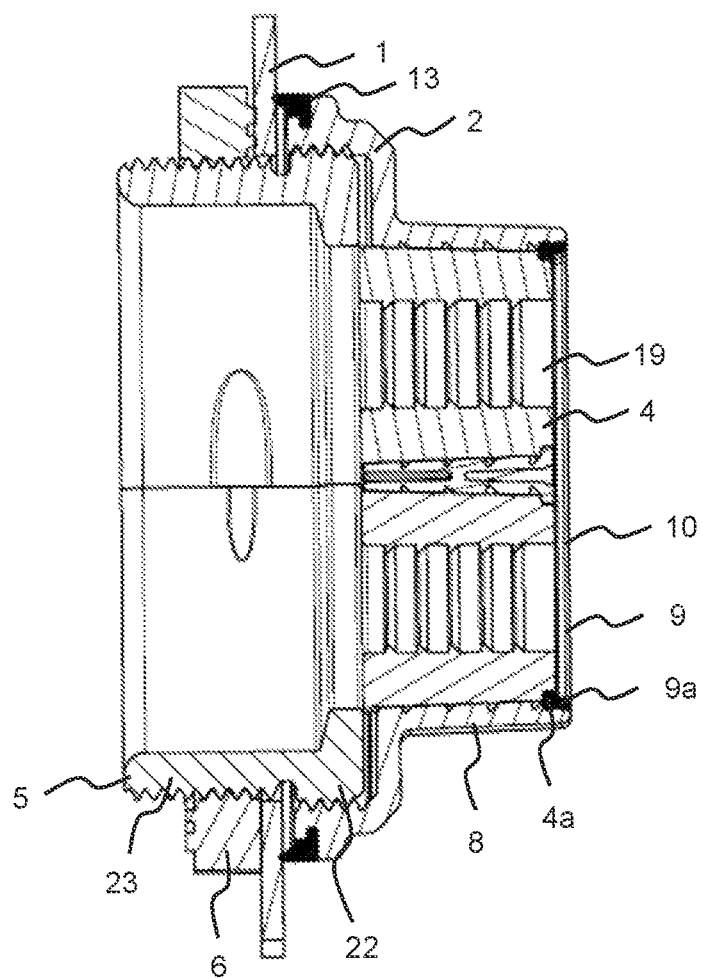
Figure 3:
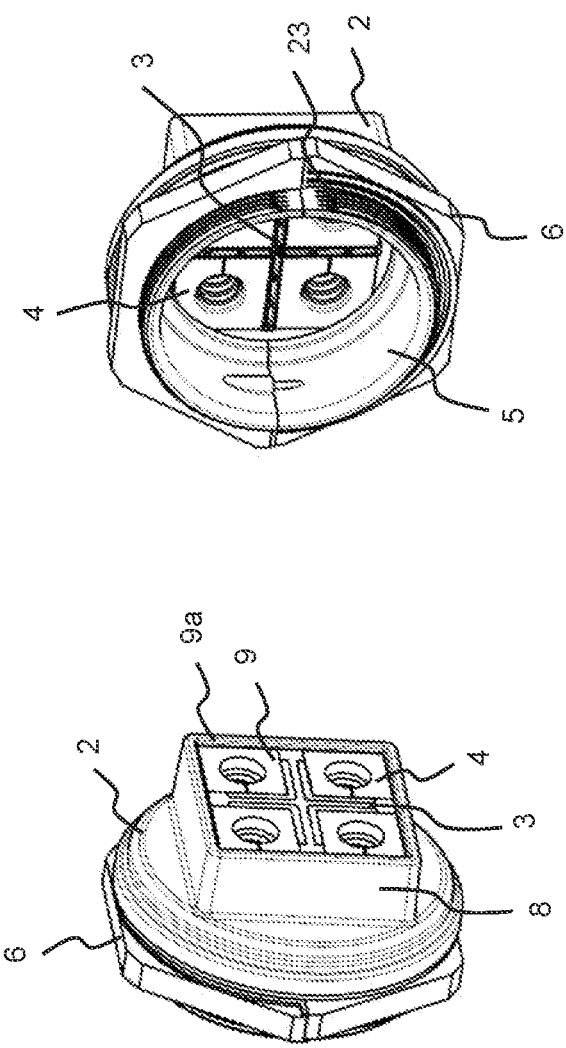

In the following, further embodiments are explained in more detail with reference to figures of a drawing. Shown here are:

FIG. 1 a schematic perspective representation of an assembly for a cable feedthrough for feeding a cable through a separating element in the unmounted state;

FIG. 2 a sectional representation of the assembly for feeding a cable through a separating element in the mounted state;

FIG. 3 schematic perspective representations of a cable feedthrough in the assembled state;

FIG. 4 schematic representations of the assembly from FIG. 3 from the front and from the rear;

FIG. 5 schematic perspective representations of another assembly for a cable feedthrough from obliquely front and obliquely rear and FIG. 6 schematic perspective representations of the other assembly for a cable feedthrough from FIG. 5 from the front and in section.

FIG. 1 shows a schematic perspective representation of an assembly for a cable feedthrough for feeding cables (not shown) through a separating element 1, which can be, for example, a separating wall or a housing wall, for example, a housing wall of a control cabinet or an electrical or electronic device. A feedthrough housing 2, a dividing component 3, sealing elements 4 and a screw-in and locking component 5 are provided for the cable feedthrough. Furthermore, a fastening component 6 is shown in FIG. 1, which is provided in the embodiment shown in order to secure the cable feedthrough on the separating element 1 by forming a screw connection between the fastening component 6 and the screw-in and locking component 5 (see FIG. 2).

The feedthrough housing 2 has a housing interior 7 which is delimited by a lateral housing wall 8 and a housing bottom 9. In the region of the housing bottom 9, a bottom opening 10 is formed which, in the embodiment illustrated, is designed to largely encompass the housing bottom 9 and is used to feed the cables (not illustrated) through. A seal 9a is arranged circumferentially around the bottom opening 10. In the embodiment shown, the seal 9a is formed with a web (sealing web). The seal 9a is integrally formed on the feedthrough housing 2, for example, by means of 2C injection molding. Alternatively, it can be provided that the seal 9a is detachably arranged on the feedthrough housing 2, for example, as a removable sealing ring or collar. In the installed state (see FIGS. 2 to 4) of the sealing elements 4, the seal 9a rests against said sealing elements and thus seals them laterally along a portion adjacent to the feedthrough housing 2. Here, the seal 9a is in sealing contact with a rear surface 4a of the sealing elements 4 (see particularly FIG. 2).

It can be provided that the seal 9a encompasses an edge region of the sealing element 4. Alternatively or in addition, it can be provided that the seal 9a lies in a groove 4b on the sealing element 4.

The feedthrough housing 2 also has an internal screw-thread 11. A circumferential seal 13 is provided on the feedthrough housing 2 in the region of an end-face surface 12.

The dividing component 3 has intersecting dividing walls 14, so that receptacles 15 are provided into which the sealing elements 4 can be inserted when the dividing component 3 is arranged in the housing interior 7 of the feedthrough housing 2 (see FIG. 2). When inserting into the interior 7 of the feedthrough housing 2, portions 16 of the separating walls 14 on the outside or at the edge are arranged in associated guides 17 in the housing interior 7. In this way, the dividing component 3 can be arranged in a self-retaining manner in the housing interior 7, for example, in a self-clamping manner. A surface-side seal made of an elastic material can be provided in the region of the edge-side portions 16.

In the embodiment illustrated, the sealing elements 4 have a separating cut 18 in the longitudinal direction, through which a cable can be introduced in the passage 19 of the respective sealing element 4. The sealing elements 4 have a plurality of sealing lips 20 around the circumference. In a comparable manner, inner sealing lips 21 are provided in the passage 19.

The screw-in and locking component 5 has a proximal screw-thread portion 22 and a distal screw-thread portion 23, which, in the embodiment shown, are arranged on component portions having different diameters. In the illustrated embodiment, the screw-in and locking component 5 is formed in several parts with two component halves 24, 25 which can be detachably connected to one another by means of projections 26 and associated recesses 27 in order to then screw the proximal screw-thread portion 22 into the internal screw-thread 11 of the feedthrough housing 2, so that here the dividing component 3 and the sealing elements 4 are secured, particularly clamped, in such a way that an end-face surface of the screw-in and locking component 5 facing them respectively comes to rest against the dividing component 3 and sealing elements 4.

For mounting on the separating element 1 in the region of an opening 28, the distal screw-thread portion 23 can then be partially fed through the opening 28 in order to screw on the fastening component 6. A cable feedthrough designed in this way is shown in section in FIG. 2. Alternatively or in addition, it can be provided that an internal screw-thread is formed along the circumferential edge 29 of the opening 28, into which the distal screw-thread portion 23 is screwed.

FIGS. 3 and 4 show schematic representations of an assembly in which the cable feedthrough is assembled without being mounted on the separating element 1. The same reference numbers are used in FIGS. 3 and 4 as in FIGS. 1 and 2 for the same features.

FIGS. 5 and 6 show schematic representations of another assembly for a cable feedthrough. The same reference numerals are used in FIGS. 5 and 6 for the same features as in the embodiment in FIGS. 1 to 4.

Sealing elements 4 are inserted into associated receptacles 15, which are provided in the feedthrough housing 2 by means of the dividing component 3.

In contrast to the embodiment in FIGS. 1 to 4 having the screw-in and locking component 5, breakthroughs 30 are provided on the feedthrough housing 2, into which breakthroughs screw means (not shown) can be inserted in order to fasten the feedthrough housing 2 to a separating or housing wall, not shown to simplify the representation, in such a way that the circumferential seal 13 seals the housing interior 7. The seal 9a is arranged on the feedthrough housing 2 for sealing in the region of the bottom opening 10. When arranged in an inserted end position, the sealing elements 4 come to a stop here, so that a sealing effect is formed circumferentially along the circumference of the bottom opening 10. According to the sectional representation in FIG. 6, the seal 9a lies with a protruding portion 9b in an associated groove 4a on the sealing element 4. The seal 9a has, comparable to the example in FIG. 2, an L-shape in cross-section, which is optional.

The features disclosed in the above description, the claims and the drawing can be important both individually and in any combination for the implementation of the various embodiments.

The invention claimed is:

1. A cable feedthrough for feeding cables through a separating element, comprising:
    a feedthrough housing which has a housing interior which is delimited by a lateral housing wall and a housing bottom having a bottom opening for feeding a plurality of cables through;
    a dividing component which is arranged in the housing interior opposite the housing bottom and provides receptacles;
    sealing elements which are each arranged in one of the receptacles and which each have a cable passage which is designed to sealingly receive a cable; and
    a screw-in and locking component which has a proximal screw-thread portion and a distal screw-thread portion with respect to the feedthrough housing,
    the proximal screw-thread portion being screwed into an internal screw-thread portion of the feedthrough housing in such a way that the dividing component and the sealing elements are thereby secured in the housing interior by means of the screw-in and locking component, and
    the distal screw-thread portion being designed to form, with a thread connection partner, a screw connection for mounting the feedthrough housing in the region of an opening in a separating element.

2. The cable feedthrough according to claim 1, wherein the sealing elements are made of an elastic material and the screw-in and locking component presses against the sealing elements in the screwed-in position, so that said sealing elements sealingly receive a respective cable.

3. The cable feedthrough according to claim 1, wherein the dividing component is arranged in a self-retaining manner in the housing interior.

4. The cable feedthrough according to claim 1, wherein the dividing component is arranged in associated guides on an interior side of the feedthrough housing.

5. The cable feedthrough according to claim 1, wherein the proximal and the distal screw-thread portion are formed on component portions of the screw-in and locking component, which have different outer diameters.

6. The cable feedthrough according to claim 1, wherein the screw-in and locking component is constructed in several parts.

7. The cable feedthrough according to claim 1, wherein a stop for inserting the screw-in and locking component is formed in the opening of the separating element on the component portion of the screw-in and locking component on which the proximal screw-thread portion is arranged.

8. The cable feedthrough according to claim 1, wherein the feedthrough housing has a circumferential seal on an end face which comes to rest against the separating element during mounting.

9. The cable feedthrough according to claim 1, wherein the receptacles provided in the housing interior by means of the dividing component are conical in form.

10. The cable feedthrough according to claim 1, wherein the bottom opening in the region of the housing bottom is surrounded by a seal at least in portions.

11. The assembly according to claim 10, wherein a distal screw-thread portion of a screw-in and locking component of the cable feedthrough is screwed to an internal screw-thread in the region of the opening of the separating element and/or a fastening component in order to form the screw connection.

12. An assembly, comprising
    a separating element which has an opening;
    a cable feedthrough according to claim 1 and
    cables which are sealingly fed through the opening of the separating element by means of the cable feedthrough;
    the cable feedthrough being mounted on the separating element by means of a screw connection.

13. A cable feedthrough for feeding cables through a separating element, comprising:
    a feedthrough housing which has a housing interior which is delimited by a lateral housing wall and a housing bottom having a bottom opening for feeding a plurality of cables through;
    a dividing component which is arranged in the housing interior opposite the housing bottom and provides receptacles; and
    sealing elements which are each arranged in one of the receptacles and which each have a cable passage which is designed to sealingly receive a cable;
    the bottom opening in the region of the housing bottom is surrounded at least in portions by a seal arranged on the feedthrough housing, on which seal the sealing elements, when arranged in the receptacle, sealingly come to rest against.

* * * * *